(12) United States Patent
Ur et al.

(10) Patent No.: US 9,064,185 B2
(45) Date of Patent: Jun. 23, 2015

(54) PREVENTING CLASSIFICATION OF OBJECT CONTEXTUAL INFORMATION

(75) Inventors: Shmuel Ur, Galil (IL); Shay Bushinsky, Ganei Tikva (IL)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 185 days.

(21) Appl. No.: 13/642,502

(22) PCT Filed: Dec. 28, 2011

(86) PCT No.: PCT/US2011/067627
§ 371 (c)(1),
(2), (4) Date: Oct. 19, 2012

(87) PCT Pub. No.: WO2013/100980
PCT Pub. Date: Jul. 4, 2013

(65) Prior Publication Data
US 2013/0188828 A1    Jul. 25, 2013

(51) Int. Cl.
   G06K 9/00    (2006.01)
   G06K 9/62    (2006.01)
   G06F 17/00   (2006.01)
   G06K 9/72    (2006.01)

(52) U.S. Cl.
   CPC .............. G06K 9/6201 (2013.01); G06F 17/00 (2013.01); G06K 9/72 (2013.01)

(58) Field of Classification Search
   None
   See application file for complete search history.

(56) References Cited

U.S. PATENT DOCUMENTS

| 7,113,641 | B1 | 9/2006 | Eckes et al. | |
| 2004/0119986 | A1 | 6/2004 | Benke et al. | |
| 2007/0047809 | A1 | 3/2007 | Sasaki | |
| 2008/0205771 | A1* | 8/2008 | Kraus et al. | 382/224 |
| 2009/0161963 | A1* | 6/2009 | Uusitalo et al. | 382/203 |
| 2009/0300122 | A1 | 12/2009 | Freer | |
| 2011/0038512 | A1 | 2/2011 | Petrou et al. | |
| 2011/0050897 | A1 | 3/2011 | Cobb et al. | |
| 2011/0052049 | A1 | 3/2011 | Rajaraman et al. | |
| 2012/0221552 | A1* | 8/2012 | Reponen et al. | 707/722 |

OTHER PUBLICATIONS

"Access control list," Wikipedia, http://en.wikipedia.org/wiki/Access_control_list, last accessed Oct. 11, 2012, 3 pages.
"Beyond Roles: A practical Approach to Enterprise User Provisioning," Jul. 13, 2006, © 2012 Hitachi ID Systems, Inc., 19 pages.
"Lattice-based access control," Wikipedia, http://en.wikipedia.org/wiki/Lattice-based_access_control, last accessed Oct. 11, 2012, 2 pages.

(Continued)

Primary Examiner — Amara Abdi
(74) Attorney, Agent, or Firm — Brundidge & Stanger, P.C.

(57) ABSTRACT

Technology is disclosed for preventing classification of objects, e.g., in an augmented reality system. The technology can identify a set of objects to be classified, determine whether context information for one or more objects in the identified set of objects to be classified is identified as not to be employed during classification, and during classification of two different objects, include context information for one object but not the other.

23 Claims, 5 Drawing Sheets

(56) References Cited

OTHER PUBLICATIONS

"Role-based access control," Wikipedia, http://en.wikipedia.org/wiki/Role-based_access_control, last accessed Oct. 11, 2012, 5 pages.

"Timing Attack," Wikipedia, http://en.wikipedia.org/wiki/Timing_attack, last accessed Oct. 11, 2012, 3 pages.

Aryan, Anoop and Sanjay Singh, "Protecting Location Privacy in Augmented Reality Using k-Anonymization and Pseudo-id," Int'l, Conference on Computer & Communication Technology, ICCCT'10, © 2010 IEEE, pp. 119-124.

Beresford, Alastair R. and Frank Stajano, "Location Privacy in Pervasive Computing," Pervasive Computing Jan.-Mar. 2003, Published by IEEE CS and IEEE Communications Society, © 2003 IEEE, pp. 46-55.

Buchegger, Sonja et al., "Reputation Systems for Self-Organized Networks: Lessons Learned," 10 pages, http://infoscience.epfl.ch/record/126462/files/soctec.pdf?version=1 [last accessed Oct. 11, 2012].

Dodsworth, Clark, "Smartphone Augmented Reality Context is King," Osage Associates, Gartner Dec. 2009, 57 pages, http://www.californiaconsultants.org/download.cfm/attachment/CNSV-1004-Dodsworth.pdf [last accessed Oct. 11, 2012].

Hong, Jason I-An, "An Architecture for Privacy-Sensitive Ubiquitous Computing," Spring 2005 Dissertation, Graduate Division of the University of California, Berkeley, © 2005 by Jason I-An Hong, 333 pages.

International Search Report and Written Opinion for PCT Application No. PCT/US11/67627 filed Dec. 28, 2011; mailed Apr. 27, 2012, 7 pages.

Kitahara, Itaru et al., "Stealth Vision for Protecting Privacy," Proceedings of ICPR, 2004, 4 pages.

Mundinger, Jochen et al., "Analysis of a Reputation System for Mobile Ad-Hoc Networks with Liars," Jun. 26, 2007, 18 pages, http://infoscience.epfl.ch/record/109325/files/MunLeB06PE.pdf?version=1 [last accessed Oct. 11, 2012].

Pareschi, Linda et al., "Composition and Generalization of Context Data for Privacy Preservation," Pervasive Computing and Communications 2008, 6th Annual IEEE International Conference Mar. 17-21, 2008, 5 pages.

"Polar Rose technology solutions," accessed at http://web.archive.org/web/20100924225211/http://info.polarrose.com/solutions.php/, accessed at Dec. 5, 2014, pp. 1-3.

Talukder, N., and Ahamed, S.I., "How Much Room before you Rely: Balancing Privacy Control and Fidelity in the Location-based Pervasive Applications," Ninth International Conference on Mobile Data Management Workshops, pp. 63-70 (Apr. 27-30, 2008).

* cited by examiner

PREVENTING CLASSIFICATION OF OBJECT CONTEXTUAL INFORMATION

CROSS-REFERENCE TO RELATED APPLICATIONS

This application is a U.S. National Stage application filing under 35 U.S.C. §371 of International Application No. PCT/US2011/067627, filed on Dec. 28, 2011, entitled "PREVENTING CLASSIFICATION OF OBJECT CONTEXTUAL INFORMATION," which is incorporated herein by reference in its entirety.

BACKGROUND

The number of mobile computing devices in use has increased dramatically over the last decade and continues to increase. Examples of mobile computing devices are mobile telephones, digital cameras, and global positioning system ("GPS") receivers. According to one study, 60% of the world's population has access to mobile telephones. An increasing number of people use digital cameras and some manufacturers of digital cameras presently have revenues of tens of billions of United States dollars annually. GPS receivers can be employed to identify location; measure speed, or acceleration; and for other purposes. In many cases, all three technologies are featured together in some products. As examples, there are now highly portable digital cameras embedded in mobile telephones and other handheld computing devices. Some mobile phones also have GPS receivers to enable users to find their location, directions to a destination, etc. Some digital cameras have GPS receivers to record where a photo was taken.

Digital cameras are used to capture, store, and share images. Often, the images can be viewed nearly immediately after they are captured, such as on a display device associated with the digital cameras. Once an image is captured, it can be processed by computing devices. Image recognition is one such process that can be used to recognize and identify objects in an image. For example, image recognition techniques can determine whether an image contains a human face, a particular object or shape, etc.

Image recognition can be used to provide additional information about a recognized object. As an example, when an object is recognized by a computing device (e.g., by a phone when a user digitizes scene), the computing device can provide additional information about the recognized object.

Augmented reality is a view of a physical, real-world environment that is enhanced by computing devices to digitally augment visual or auditory information a user observes in the real world. As an example, an augmented reality system can receive scene information from a digital camera and a GPS, identify objects (e.g., people, animals, structures, etc.) in the scene, and provide additional information relating to the identified objects (e.g., names or other information). A user of such a system can take a photo of a scene using a mobile computing device (e.g., a digital camera, a cellular phone, a "smartphone," etc.) and automatically receive information about one or more objects an augmented reality system recognizes in the photographed (i.e., digitized) scene.

To assist in rapidly identifying objects in digitized scenes, augmented reality systems can use classifications for the objects. As an example, an augmented reality system can receive and classify information from multiple sources. The augmented reality system can receive information, e.g., contextual information, from an object directly (e.g., GPS information indicating the object's present geographic location), from other objects (e.g., the color of apparel presently worn by a person when that person is photographed by a friend who has taken many photos of that person), etc. This information is "classified" by associating such information with the object. Then, when a third party—whether known or unknown to an object—digitizes a scene including the object, the augmented reality system can review the classifications to narrow down objects for analysis, e.g., by limiting consideration to only objects matching the classifications. As an example, the augmented reality system can identify a person near a house as a particular person even without recognizing the facial features of the person. The augmented reality system may do this, e.g., by matching what the person is wearing, the time of day, the shape or approximate dimensions of the person, the location of the person, etc. Thus, augmented reality systems can employ classifications of objects to enhance their ability to identify objects, e.g., by combining recognition and matching techniques.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is described for preventing use of some types of information, e.g., contextual information, during classification of objects ("the technology"). In various embodiments, the technology can prevent use of contextual information during classification of objects in an augmented reality system or in other systems. The technology receives an indication that contextual information of an object is not to be employed during an object classification process, e.g., of an augmented reality system. An object is a real-world entity (e.g., human, animal, building, or other thing) that is represented in the system by one or more corresponding components. Components can indicate that various information relating to the object is not to be used during classification, e.g., by indicating that contextual information of their corresponding objects are not to be employed during classification. During the classification process, the technology can employ available (e.g., non-contextual) information for classification of objects. In various embodiments, when an object indicates that its contextual information is not to be used during classification, the technology can either not classify the object entirely or only employ non-contextual information for the object. Contextual information is information that can be used to identify the location of an object, e.g., GPS coordinates, postal address, city, state or province, country, street intersection, etc.; or information that identifies associations between objects, e.g., owner/employee, family members, friends, etc.

Components corresponding to objects can expose one or more interfaces, e.g., using classes, that enable other components (e.g., components of the augmented reality system) to query the corresponding objects for settings indicating whether or not they or various information (e.g., attributes) relating to the object are to be classified. In various embodiments, the settings may be exposed via a privacy class and can correspond to various access control levels, e.g., role-based, lattice-based, etc. As an example, objects can indicate that family members and friends can receive full contextual information (e.g., street address), colleagues and other acquaintances can receive more generalized or abstracted contextual information (e.g., city), and others can receive no contextual information. When an augmented reality system is requested to provide augmented information for objects in a scene, the augmented reality system can honor these settings so that contextual information about an object in a scene is only used if permitted by the object.

In various embodiments, the technology functions with "cloud-based" augmented reality systems, e.g., systems that classify objects using dynamically available information.

Figure 1:
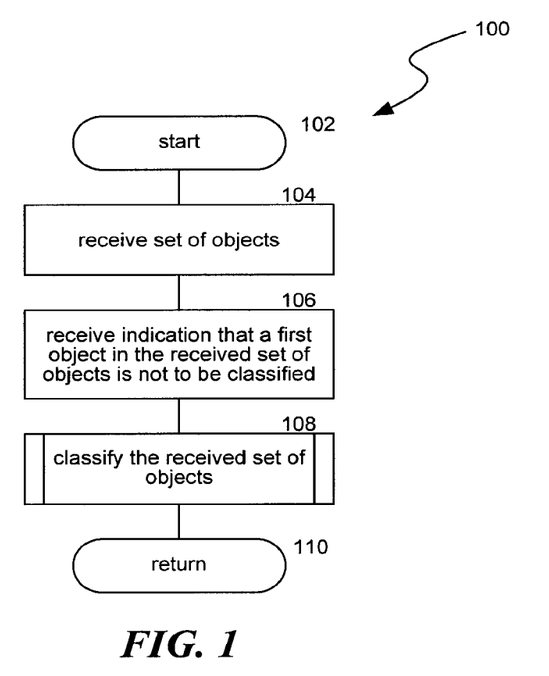
FIG. 1 is a flow diagram illustrating a routine the technology may invoke in various embodiments.

Turning now to the figures, FIG. 1 is a flow diagram illustrating a routine 100 invoked by the technology in various embodiments. The routine 100 begins at block 102 and continues at block 104. At block 104, the routine 100 receives a set of objects. Examples of objects are people, animals, physical items, structures, etc. The routine 100 then continues at block 106. At block 106, the routine 100 receives an indication that contextual information for a first object in the received set of objects is not to be used during classification. The indication may be received using various means. As an example, an object may have an associated class that can be queried by a component of the augmented reality system, e.g., via an interface. When the associated class is queried by the component, the class may indicate that contextual information relating to the corresponding object is not to be used during classification. As examples, the augmented reality system may use access control lists, role-based access control, lattice-based access control, etc. In other embodiments, the components can use other means or settings, e.g., boolean values. The routine 100 then continues at block 108. At block 108, the routine 100 invokes a subroutine to classify the received set of objects. As an example, the routine 100 may invoke a subroutine described in further detail below in relation to FIG. 2. The routine 100 then returns at block 110.

Those skilled in the art will appreciate that the logic illustrated in FIG. 1 and described above, and in each of the flow diagrams discussed below, may be altered in a variety of ways. For example, the order of the logic may be rearranged, substeps may be performed in parallel, illustrated logic may be omitted, other logic may be included, etc.

Figure 2:
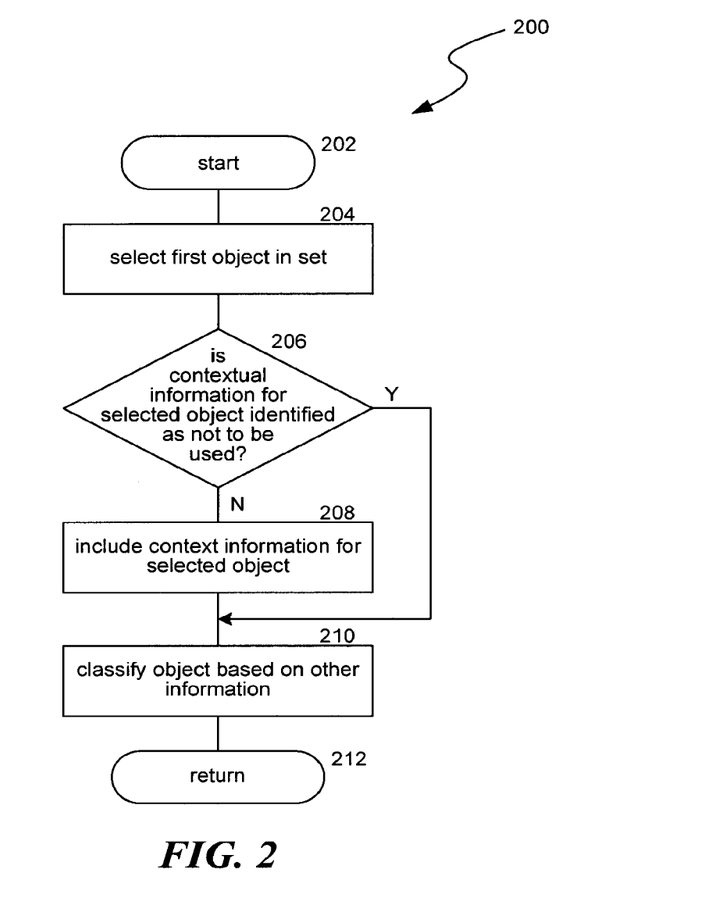
FIG. 2 is a flow diagram illustrating a routine invoked by the technology in various embodiments.

FIG. 2 is a flow diagram illustrating a routine 200 invoked by the technology in various embodiments. The routine 200 begins at block 202 and continues at block 204. At block 204, the routine 200 selects a first object in a set of objects. The routine 200 then continues at decision block 206. At decision block 206, the routine 200 determines whether contextual information for the selected object is identified as not to be used during classification. If the contextual information is not to be used, the routine 200 continues at block 210. Otherwise, the routine 200 includes context information for the selected object. Examples of context ("contextual") information include, e.g., address, geographic location, or other information that can be used to identify where an object can be found. The routine 200 then continues at block 210. At block 210, the routine 200 classifies the selected object based on other, e.g., non-contextual, information. As examples, the routine 200 may classify the selected object based on physical attributes, detection and recognition of various visual or auditory features, etc. The routine 200 then returns at block 212.

Figure 3:
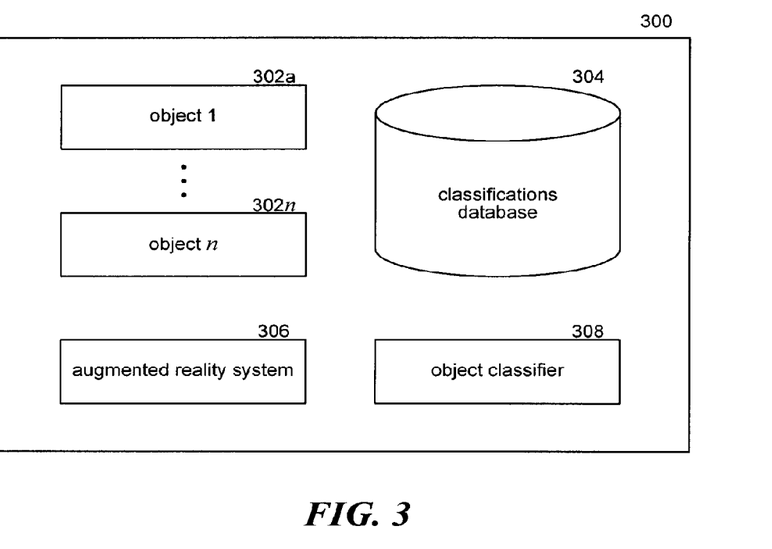
FIG. 3 is a block diagram illustrating components employed by the technology in various embodiments.

FIG. 3 is a block diagram illustrating components 300 employed by the technology in various embodiments. The components 300 can include one or more object components 302a through 302n. The term "objects" as used herein generally refers to physical or "real-world" objects and the object components 302a through 302n are software or hardware components corresponding to the physical or "real-world" objects. As an example, an augmented reality system may include one or more object components corresponding to physical objects that the augmented reality system is capable of recognizing or matching. An object component is described in further detail below in relation to FIG. 4. The components 300 can also include a classifications database 304. The classifications database 304 can store classifications associated with one or more objects. The components 300 can also include an augmented reality system 306. The augmented reality system 306 can employ an object classifier 308 to classify objects, e.g., using object components 302a through 302n so that when the augmented reality system 306 receives a query relating to a particular object, the augmented reality system 306 can employ classifications or other information to augment information about the object for which it received a query.

Although an augmented reality system is disclosed herein, one skilled in the art will recognize that the technology is applicable for systems other than augmented reality systems that also classify objects.

Figure 4:
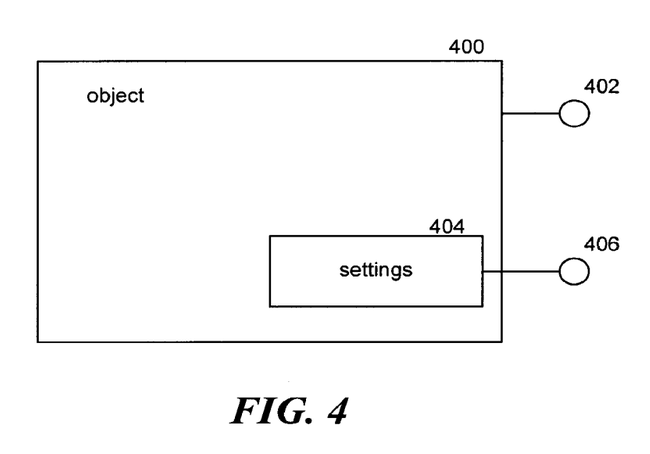
FIG. 4 is a block diagram illustrating components employed by the technology in various embodiments.

FIG. 4 is a block diagram illustrating an object component 400 employed by the technology in various embodiments. The object component 400 can include one or more settings 404. An example of a setting 404 is whether or not context information should be used when classifying an object corresponding to the object component 400. The setting can be a boolean or other value, and can be exposed either directly or via a class interface. The object component 400 may include one or more interfaces. An interface 402 enables components of an augmented reality system to interact with the object 400. An interface 406 enables components of the augmented reality system to query settings of the object component 400. In various embodiments, interfaces 402 and 406 may merge into a single interface.

Figure 5:
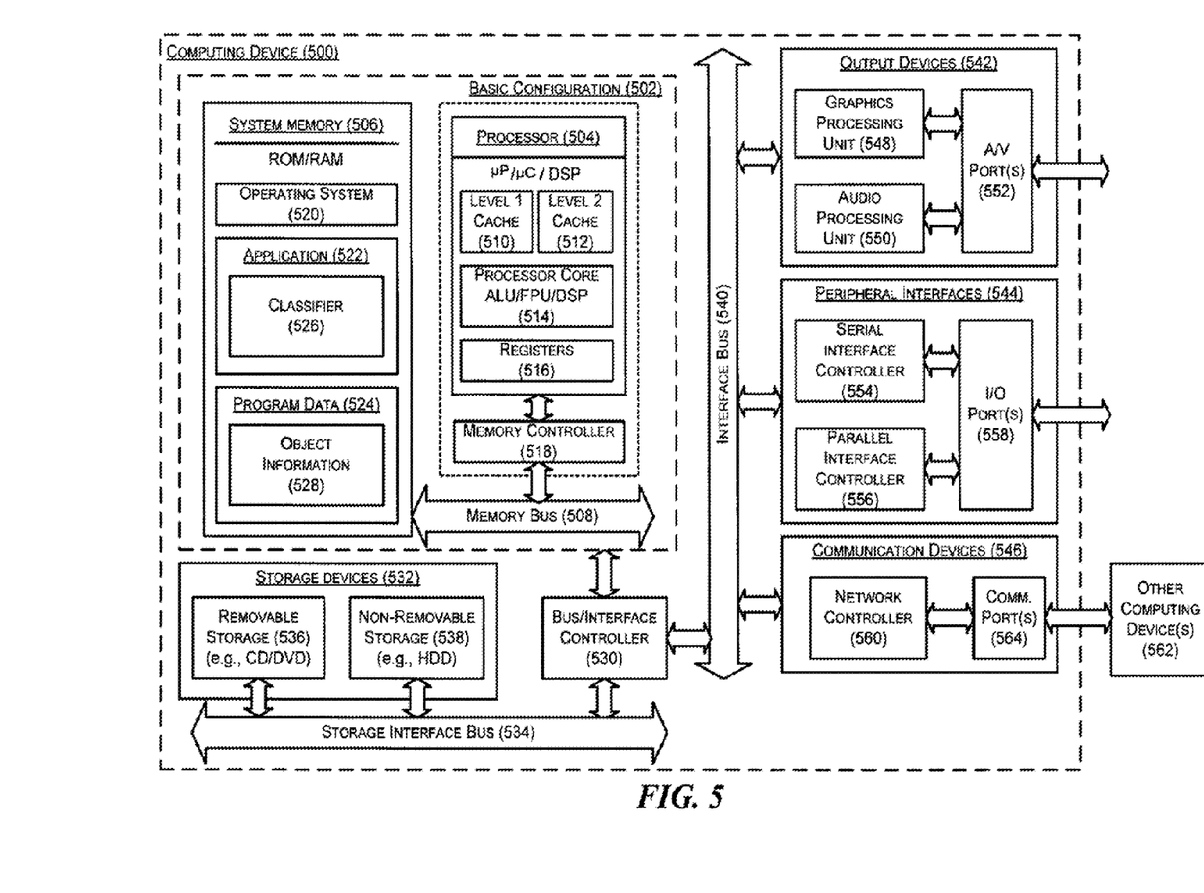
FIG. 5 is a block diagram of an illustrative embodiment of a computing device that is arranged in accordance with at least some embodiments of the present disclosure.

FIG. 5 is a block diagram illustrating an example computing device 500 that is arranged in accordance with at least some embodiments of the present disclosure. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor ("µP"), a microcontroller ("µC"), a digital signal processor ("DSP"), or any combination thereof. Processor 504 may include one more levels of caching, such as a level one cache 510 and a level two cache 512, a processor core 514, and registers 516. An example processor core 514 may include an arithmetic logic unit ("ALU"), a floating point unit ("FPU"), a digital signal processing core ("DSP Core"), or any combination thereof. An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof. System memory 506 may include an operating system 520, one or more applications 522, and program data 524. Application 522 may include an augmented reality system classifier 526 that is arranged to classify objects. Program data 524 may include object information 528, as is described herein. In some embodiments, application 522 may be arranged to operate with program data 524 on operating system 520 to classify objects. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof. Examples of removable storage and non-removable storage devices include magnetic disk devices such as flexible disk drives and hard-disk drives ("HDD"), optical disk drives such as compact disk ("CD") drives or digital versatile disk ("DVD") drives, solid state drives ("SSD"), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more A/V ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency ("RF"), microwave, infrared ("IR") and other wireless media. The term computer readable media as used herein may include both storage media and communication media.

Computing device 500 may be implemented as a portion of a small-form factor portable (or mobile) electronic device such as a cell phone, a personal data assistant ("PDA"), a personal media player device, a wireless web-watch device, a personal headset device, an application specific device, or a hybrid device that include any of the above functions. Computing device 500 may also be implemented as a personal computer including both laptop computer and non-laptop computer configurations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method to classify objects, comprising:
   evaluating information related to each of the first and second objects for indication that contextual information should not be used in classifying the first and second objects;
   in accordance with an indication that contextual information related to the first object should not be used in classifying the first object, forgoing classifying the first object based on contextual information related to the first object; and
   in accordance with the absence of an indication that contextual information related to the second object should not be used in classifying the second object, classifying the second object based on information related to the second object.

2. The method of claim 1, wherein the evaluating includes evaluating a setting corresponding to the first object indicating whether the first object is to be classified in accordance with the contextual information.

3. The method of claim 2, wherein the setting is at least one of an access control, a role-based access control, or a lattice-based access control.

4. The method of claim 1, wherein the first object is associated with a user.

5. The method of claim 1, further comprising, in accordance with an indication that contextual information related to the first object should not be used in classifying the first object, forgoing classifying the first object.

6. The method of claim 1, wherein contextual information includes location information.

7. The method of claim 1, wherein the evaluating includes querying a privacy class provided by the first object.

8. The method of claim 1, further comprising supplying by the first object contextual information related to the first object to a querying third object when the third object is indicated to be trusted by the first object.

9. The method of claim 8, wherein the third object is a member of a set of objects to be classified that includes the first and second objects.

10. The method of claim 1, wherein a boolean setting indicates that contextual information related to the first object is not to be used to classify of the first object.

11. A non-transitory computer-readable storage device storing computer-executable instructions that, if executed by a computing device, cause the computing device to perform operations comprising:
   determining whether contextual information related to first and second objects should not be used in classifying the first and second objects;
   in accordance with an indication that contextual information related to the first object should not be used in classifying the first object, forgoing classifying the first object based on contextual information related to the first object; and
   in accordance with the absence of an indication that contextual information related to the second object should not be used in classifying the second object, classifying the second object based on contextual information related to the second object and on non-contextual information related to the second object.

12. The non-transitory computer-readable storage device of claim 11, further comprising instructions that, if executed by computing device, cause the computing device to perform operations comprising evaluating a setting corresponding to the first object.

13. The non-transitory computer-readable storage device of claim 11, further comprising instructions that, if executed by a computing device, cause the computing device to perform operations comprising forgoing classifying the first object.

14. The non-transitory computer-readable storage device of claim 11, further comprising instructions that, if executed by a computing device, cause the computing device to perform operations comprising supplying, by the first object, contextual information related to the first object to a querying third object when the third object is indicated to be trusted by the first object.

15. A system, comprising:
   an object classifier configured to receive information of first and second objects, query a privacy setting of each of the first and second objects, and classify the first and second objects based on at least their privacy settings;
   a database of classified objects, wherein the database includes contextual information for the first and second objects;
   a first object component corresponding to the first object whose privacy setting indicates that the contextual information related to the first object is not to be employed in classifying the first object; and
   a second object component corresponding to the second object whose privacy setting does not indicate that the contextual information related to the second object is not to be employed in classifying the second object.

16. The system of claim 15, wherein the privacy setting for the first object indicates that a third object can receive contextual information related to the first object.

17. The system of claim 16, wherein in response to the third object querying the first object for contextual information, the third object receives the contextual information related to the first object; and in response to the second object querying the first object for contextual information, the second object does not receive the contextual information related to the first object.

18. The system of claim 15, wherein at least one of the first and second objects is associated with a user.

19. The system of claim 15, further comprising a component configured to receive an image of an object and provide information about the object, wherein the provided information includes contextual information stored in the database, if any.

20. The system of claim 15, further comprising one or more augmented reality components.

21. The method of claim 1, wherein contextual information is information related to identifying at least one of object location and association between objects.

22. The non-transitory computer-readable storage device of claim 11, wherein contextual information is information related to identifying at least one of object location and association between objects.

23. The system of claim 15, wherein contextual information is information related to identifying at least one of object location and association between objects.

* * * * *

UNITED STATES PATENT AND TRADEMARK OFFICE
CERTIFICATE OF CORRECTION

| | |
|---|---|
| PATENT NO. | : 9,064,185 B2 |
| APPLICATION NO. | : 13/642502 |
| DATED | : June 23, 2015 |
| INVENTOR(S) | : Ur et al. |

It is certified that error appears in the above-identified patent and that said Letters Patent is hereby corrected as shown below:

In the specification

Column 1, Line 7, delete "35 U.S.C. §371" and insert -- 35 U.S.C. § 371 --, therefor.

In the claims

Column 7, Line 30, Claim 12, delete "by computing" and insert -- by a computing --, therefor.

Signed and Sealed this
First Day of December, 2015

Michelle K. Lee
*Director of the United States Patent and Trademark Office*